United States Patent [19]

Aloy et al.

[11] Patent Number: 6,075,176
[45] Date of Patent: Jun. 13, 2000

[54] IRON-PHOSPHATE CERAMICS FOR SOLIDIFICATION OF MIXED LOW-LEVEL WASTE

[75] Inventors: Albert S. Aloy; Elena N. Kovarskaya; Tatiana I. Koltsova, all of St. Petersburg, Russian Federation; Yevgeny Macheret, Idaho Falls, Id.; Pavel G. Medvedev, Ozersk, Russian Federation; Terry Todd, Aberdeen, Id.

[73] Assignee: The United States of America as represented by the United States Department of Energy, Washington, D.C.

[21] Appl. No.: 09/131,020

[22] Filed: Aug. 7, 1998

[30] Foreign Application Priority Data

Nov. 20, 1997 [RU] Russian Federation ............. 97119362

[51] Int. Cl.$^7$ ....................................................... G21F 9/34
[52] U.S. Cl. .............................. 588/3; 588/252; 588/256; 588/257; 976/DIG. 394; 501/155
[58] Field of Search ................................ 501/155; 588/3, 588/4, 10, 257, 16, 252, 256; 976/DIG. 394, DIG. 395

[56] References Cited

U.S. PATENT DOCUMENTS

| | | | |
|---|---|---|---|
| 4,354,954 | 10/1982 | Köster et al. ............................ | 252/629 |
| 5,387,740 | 2/1995 | Sasae et al. .............................. | 588/257 |
| 5,609,558 | 3/1997 | Sasae et al. .............................. | 588/257 |
| 5,640,704 | 6/1997 | Snyder et al. .............................. | 588/4 |

OTHER PUBLICATIONS

Pavel G. Medvedev, "Solidification of Radioactive Incinerator Ash Residues Using Low Temperature Setting Iron Phosphate Ceramics", Masters Thesis, Idaho State University, Aug., 1997.

D. Singh, et al. "Leaching Behavior of Phosphate–Bonded Ceramic Waste Forms", Proceedings of the 1996 Annual Meeting of the American Ceramic Society, Indianapolis, IN, Apr. 14–17, 1996.

A. Waugh, et al., "Sabilization of Low–Level Mixed Waste in Chemically Bonded Phosphate Ceramics", Proceedings of the Int'l Topical Meeting on Nuclear and Hazardous Waste Management, Spectrum '94, Aug. 14–18, 1994, Atlanta, GA, published by the ANS Inc., p. 731–736.

W. D. Kingery, "Fundamental Studies of Phosphate Bonding in Refractors: II, Cold–Setting Properties", J. Am. Ceram. Soc., vol. 33, p. 242–247, 1950.

Primary Examiner—Steven P. Griffin
Assistant Examiner—Elin Warn
Attorney, Agent, or Firm—Virginia B. Caress; William R. Moser; Paul A. Gottlieb

[57] ABSTRACT

A method of immobilizing mixed low-level waste is provided which uses low cost materials and has a relatively long hardening period. The method includes: forming a mixture of iron oxide powders having ratios, in mass %, of $FeO:Fe_2O_3:Fe_3O_4$ equal to 25–40:40–10:35–50, or weighing a definite amount of magnetite powder. Metallurgical cinder can also be used as the source of iron oxides. A solution of the orthophosphoric acid, or a solution of the orthophosphoric acid and ferric oxide, is formed and a powder phase of low-level waste and the mixture of iron oxide powders or cinder (or magnetite powder) is also formed. The acid solution is mixed with the powder phase to form a slurry with the ratio of components (mass %) of waste:iron oxide powders or magnetite:acid solution= 30–60:15–10:55–30. The slurry is blended to form a homogeneous mixture which is cured at room temperature to form the final product.

19 Claims, No Drawings

IRON-PHOSPHATE CERAMICS FOR SOLIDIFICATION OF MIXED LOW-LEVEL WASTE

BACKGROUND OF THE INVENTION

1. Field of the Invention

The present invention relates to processes of low-level mixed waste solidification.

2. Related Art

Low-level mixed waste contains hazardous chemical and low-level radioactive species. The chemical contaminants are often volatile compounds or pyrophorics and cannot be disposed of by conventional high-temperature methods.

Portland cement grouting (PCG) is one of the prior art radioactive waste solidification methods. PCG results in hydration-induced hardening. In addition to hydration-induced hardening cements, there are also chemical hardening cements. Various phosphate compositions belong to the class of chemical hardening cements. The solidification of phosphate compositions results from a number of chemical reactions of metal oxides and orthophosphoric acid at room temperature, thereby causing generation of a hard solid phosphate form with a low solubility in water. These phosphate forms are very efficient for immobilization of rare earth and transuranic elements.

Radioactive and toxic incinerator ash has also been immobilized by incorporating the ash into cements based on zirconium orthophosphate and dual magnesium-sodium and magnesium-ammonia orthophosphate. Immobilization in chemical hardening cements is caused by both physical isolation of the dispersed hazardous elements and their structural integration into the phosphate matrix upon its formation.

Phosphate binders are heterogenous systems consisting of a powder with basic properties (metal oxide or hydroxide) and phosphoric acid. Chemical reactions between the two leads to self-setting of such a system. The products of this reaction are hydrated salts of orthophosphoric acid that can be characterized as inorganic polymers. These polymers, also defined in some literature as phosphate ceramics, have several desirable characteristics including: high compression strength, adhesion to inert surfaces, insolubility in water and the ability to withstand very high temperatures.

The relevant prior art processes concern incinerator ash immobilization in a magnesium-phosphate cement matrix. The prior art process is implemented by the following operations:

1. Preparation of cement powder by mixing magnesium oxide powders calcined at 1,000° C., and 15 mass % boric acid (reaction moderator);
2. Mixing of the generated cement powder and the ash powder;
3. Mixing of the generated powder and 50% orthophosphoric acid solution; and
4. Molding and setting of the samples.

The generated magnesium-phosphate cement samples incorporate 35 mass % of the incinerator ash. The compression strength of these samples is 275 kg/cm$_2$. The leach rate data for toxic and radioactive metals have been obtained by using Environmental Protection Agency Method 1311, Toxicity Characteristic Leaching Procedure (TCLP) and American Nuclear Society, American National Standards Institute Measurement of the Leachability in Solidified Low-Level Radioactive Wastes by a Short-Term Test Procedure, Method (ANSI 16.1). The leach rate values for the toxic metals obtained by TCLP method do not exceed the established limits, while the determined leachability indices for various elements, estimated by ANSI 16.1, range from 15 to 22, thereby exceeding the passing criterion of 6 set by the Nuclear Regulatory Commission (NRC).

The sample mass loss during long-lasting leaching tests does not exceed 1%. Therefore, the characteristics of the magnesium-phosphate materials that incorporate incinerator ash indicate their high chemical stability and compression strength.

The prior art magnesium-phosphate cement used for incinerator ash immobilization suffers from a number of disadvantages. Magnesium oxide is expensive and requires high-temperature annealing to slow down its reaction speed. In addition, the composition is difficult to mix because of how fast it hardens. The prior art magnesium-phosphate cements also require the application of additives that function as moderators, e.g. boric acid, to slow down hardening.

SUMMARY OF THE INVENTION

An object of the invention is immobilization of incinerator ash into the phosphate compositions that will provide the optimal hardening speed and leaching resistance.

In accordance with a first embodiment of the invention, a method of immobilizing mixed low-level waste is provided. The method includes: (a) forming a mixture of iron oxide powder having ratios in mass % of $FeO:Fe_2O_3:Fe3O_4$= 25–40:40–10:35–50; (b) forming a powder phase of waste powder and the mixture of iron oxide powder; (c) forming a solution of orthophosphoric acid; (d) mixing the acid solution with the powder phase of waste powder and the mixture of iron oxide powder in mass % of waste powder::iron oxide powder:solution=30–60:15–10:55–30 to form a slurry; (e) blending the slurry to form a homogeneous mixture; and (f) curing the homogeneous mixture at room temperature to form a final product.

In a preferred embodiment, the solution is added to the powder phase of waste powder and the mixture of iron oxide powder in step (d). In an alternative preferred embodiment, the waste powder is mixed with the orthophosphoric acid, then the mixture of iron oxide powder is added to the acid/waste mixture.

In one alternative embodiment, the iron oxide powder comprises metallurgical cinder. If the ratio of $FeO:Fe_2O_3:Fe_3O_4$ in the cinder is not in the ranges of (25–40):(40–10):(35–50), then the appropriate amount of iron oxides should be added.

Another method of immobilizing mixed low-level waste is provided in accordance with a second embodiment of the invention, wherein the naturally occurring ore magnetite is used as the source of iron oxides. Magnetite is an iron oxide with the theoretical formula $Fe_3O_4=FeO.Fe_2O_3$. The method includes: (a) preparing a predetermined amount of magnetite powder; (b) forming a powder phase of waste powder and the magnetite powder; (c) forming a solution of ferric oxide in orthophosphoric acid (70–90 g. of ferric oxide per liter, in a preferred embodiment); (d) combining the acid solution with the powder phase in mass % of waste powder:magnetite powder:acid solution=30–60:15–10:55–30 to form a slurry; (e) blending the slurry to form a homogeneous mixture; and (f) curing the homogeneous mixture at room temperature to form a final product.

In a preferred embodiment, the acid solution is added to the powder phase of waste powder and the magnetite powder in step (d). In an alternative preferred embodiment, the powder phase of waste powder and the magnetite powder are added to the solution in step (d).

The amount of the low-level waste in the final product can be up to about 60 mass % for some types of wastes such as solid deposits or soil with phosphogypsum. In a preferred embodiment the amount of low-level waste in the final product is 30–40 mass %.

Advantageously, the pure phosphoric acid (without water) content of the slurry is about 25–35 mass %.

The present process has many advantages over the processes of the prior art, including:

1. Longer hardening period, while the hardening moderator, i.e. iron oxide (3+), also functions as the matrix material;
2. Low cost of the input materials, i.e. iron oxides;
3. Metallurgical waste (cinder) and iron-containing natural minerals (magnetite) are used as the input matrix material;
4. Ferro-magnetic properties of the matrix provide for remote transfer of the radiation hazardous compounds by means of the electromagnetic equipment; and
5. Capability to control the setting time by varying the concentration of $Fe_2O_3$ in the system.

Other features and advantages of the invention will be set forth in, or apparent from, the following detailed description of the preferred embodiments of the invention.

DESCRIPTION OF THE PREFERRED EMBODIMENTS

In a preferred embodiment of the invention iron oxides, i.e. $FeO$, $Fe_2O_3$ and $Fe_3O_4$, are used as feed powder matrix materials. Waste metallurgical cinder may be used as the source of the iron oxides provided that the ratio of the three oxides is adjusted to be mass % $FeO:Fe_2O_3:Fe_3O_4=(25–40):(40–10):(35–50)$. The specific correlations of iron oxide quantities with different iron valences makes it possible to optimize the slurry mixing and hardening time, thereby controlling the quality of the final product.

Solidification of surrogate incinerator ash waste is performed according to the following procedure:

(a) forming a mixture of iron oxide powder having ratios in mass % of $FeO:Fe_2O_3:Fe_3O_4=25–40:40–10:35–50$;
(b) forming a powder phase of waste powder and the mixture of iron oxide powder;
(c) forming a solution of orthophosphoric acid $H_3PO_4$;
(d) mixing the solution of orthophosphoric acid with the powder phase of waste powder and the mixture of iron oxide powder in mass % of waste powder:iron oxide powder:acid solution=30–60:15–10:55–30 to form a slurry;
(e) blending the slurry to form a homogeneous mixture;
(f) setting the slurry to form monolithic specimens; and
(g) curing the homogeneous mixture at room temperature to form a final product.

In an alternative preferred embodiment, the orthophosphoric acid solution is added to the waste powder and then the iron oxide powder is combined with the mixture of orthophosphoric acid and waste.

The amounts of the iron oxides with different iron valences used in the preferred embodiment optimize conditions for handling the slurry and provide good mixing, molding and hardening of the mixture 3–4 hours after the start of the process. The blending time must be long enough to allow a good mixing of the slurry, so that the waste is evenly distributed in the forming matrix. The preferred curing time is obtained by using oxides containing a cation with ionic potential of between 2.5 and 4.5, which corresponds to the oxide-phosphate systems that cure at low temperature.

In an alternative preferred embodiment, magnetite powder is used as the feed powder matrix material. Solidification of surrogate incinerator ash waste is performed according to the following procedure:

(a) preparing a predetermined amount of magnetite powder;
(b) forming a powder phase of waste powder and the magnetite powder;
(c) forming a solution of orthophosphoric acid and ferric oxide;
(d) mixing the solution of orthophosphoric acid and ferric oxide with the powder phase of waste powder and magnetite in mass % of waste powder:magnetite powder:acid solution=30–60:15–10:55–30 to form a slurry;
(e) blending the slurry to form a homogeneous mixture; and
(f) curing the homogeneous mixture at room temperature to form a final product.

The final products of the processes contain 30–60 mass % of the incinerator ash and have high compression strength values. The elements in the matrix meet the TCLP, ANSI 16.1, Material Characterization Center, test #1(MCC-1) and Product Consistency Test (PCT) leaching test requirements. The waste loading is preferably not greater than about 60%. Excessive waste loading leads to deficiencies in the final product. Furthermore, the concentration of the orthophosphoric acid solution used to prepare the slurry is preferably no less than 50 mass %, more preferably from 50–83%; and, the orthophosphoric acid content (i.e. pure $H_3PO_4$, without water) of the final slurry is preferably 25 to 35 mass %, to produce a firm ceramic matrix.

EXAMPLE 1

The present process was tested with a simulated incinerator ash mixture, the composition of which is given in Tables 1 and 2 below.

TABLE 1

| Component | Concentration, g/kg |
|---|---|
| Volatile ash | 387.96 |
| Ash slag | 320.07 |
| Vermiculite | 193.98 |
| Activated carbon | 48.49 |
| $Cr_2O_3$ | 14.80 |
| NiO | 6.16 |
| PbO | 5.22 |
| CdO | 5.54 |
| CsCl | 6.15 |
| $Ce_2O_3$ | 5.70 |
| $HgCl_2$ | 6.56 |

TABLE 2

| Oxide | Volatile ash, mass % | Ash slag, mass % |
|---|---|---|
| $SiO_2$(amorphous) | 16.5–45.6 | 40–45 |
| $SiO_2$(crystalline) | 3.4–9.4 | — |
| $Al_2O_3$ | 10–35 | 18–26 |
| CaO | 0.33–2 | 1–12 |
| $Fe_2O_3$ | 3–24 | 5–20 |
| MgO | 0.5–0.8 | 0.75–3 |

A mixture of iron oxides (from chemical reagents) was used as the iron-containing part. The components had the following ratios (mass %):

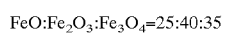

The slurry had the following composition (mass %):

Waste:Iron Oxides:70% concentration $H_3PO_4$ solution= 40:10:50. The composition was mixed for 20–30 minutes, and put into molds of 25 mm diameter and 40 mm height. The hardening of the mixture took 4 hours.

The leaching data for radioactive and toxic elements for the cement samples that have cured for 28 days are given below in Table 3 (TCLP method) and Table 4 (ANSI 16.1 method). The values obtained do not exceed the respective maximum allowable values.

EXAMPLE 2

The present process was tested with the simulated incinerator ash, the composition of which is given in tables 1 and 2. Metallurgical cinder waste was used as the iron-containing part. It was assayed and had the following ratio of iron oxides (mass %):

$FeO:Fe_2O_3:Fe_3O_4 = 40:10:50$

The components of the slurry had the following ratios (mass %):

Waste:Iron Oxides:50% concentration $H_3PO_4$ solution= 30:15:55.

The composition was mixed for 20–30 minutes, and put into molds of 25 mm diameter and 40 mm height. The hardening of the mixture took 4 hours. After curing for 28 days, the characteristics of the cement samples have been identified:

Compression strength: $\sigma_{comp}$=3570–3700 psi;

Open porosity: $P_o$=5.3 vol. %;

Bulk density: $\rho$=1.99 g/cm².

The leaching data for radioactive and toxic elements for the cement samples that have been curing for 28 days are given below in Table 3 (TCLP method). The values obtained do not exceed the respective maximum allowable values.

TABLE 3

(TCLP method)

| | Concentration in the leachant, mg/l | | | | | |
|---|---|---|---|---|---|---|
| | Cd | Cr | Ni | Pb | Hg | Ce | Cs |
| Example 1 | 0.12 | 0.042 | 5.5 | 0.001 | 0.052 | 0.005 | 0.18 |
| Example 2 | 0.14 | 0.11 | 3.5 | 0.003 | 0.18 | 0.005 | 1.2 |
| Allowable values | 0.19 | 0.86 | 5 | 0.37 | 0.2 | — | — |

TABLE 4

(ANSI 16.1 method)

| | Leaching index, Li | | | | | |
|---|---|---|---|---|---|---|
| | Ce | Cs | Cd | Cr | Pb | Hg | Ni |
| Example 1 | 14.4 | 10.5 | 12.5 | 13.7 | 16.4 | 16.4 | 8.3 |

EXAMPLE 3

The present process was tested with simulated incinerator ash, the composition of which is given in Tables 1 and 2. Naturally occurring magnetite, $Fe_3O_4$, was used as the iron-containing part. Two samples were prepared. The components had the following ratios: Waste:$Fe_3O_4$(magnetite) :50% concentration $H_3PO_4$ solution=30:15:55 and 40:10:50.

The powder mixture of waste and magnetite was mixed with a solution of 50% concentration orthophosphoric acid solution and $Fe_2O_3$ (80 g/l ) and put into 50 ml plastic beakers. The hardening of the slurry was continued during 4–5 hours.

The leaching data for radioactive and toxic elements for the final samples that were cured for 28 days are given in Table 5 (The MCC-1 static monolithic leach test) and in Table 6 (the PCT static leach test).

TABLE 5

| Waste loading, % | | 30 | 40 |
|---|---|---|---|
| Normalized release rate, g/m²/day | Cr | <0.052 | <0.037 |
| | Ce | <0.051 | <0.037 |

TABLE 6

| Waste loading, % | Normalized release rate, g/m²/day | | | | | | |
|---|---|---|---|---|---|---|---|
| | Hg | Ce | Cs | Cd | Cr | Pb | Ni |
| 30 | 0.222 | <0.034 | 0.11 | 0.011 | <0.0036 | <0.0014 | 0.021 |
| 40 | 0.151 | <0.026 | 0.24 | 0.006 | <0.0027 | <0.0019 | 0.015 |

After curing for 28 days, the characteristics of the cements samples have been identified. The characteristics are summarized in Table 7.

TABLE 7

| Waste loading, mass % | 30 | 40 |
|---|---|---|
| Density, g/cm³ | 1.63 | 1.67 |
| Weight loss, wt. % | 1.95 | 2.13 |
| Compressive strength, psi | 1050 | 2700 |

Although the invention has been described in detail with respect to preferred embodiments thereof, it will be apparent to those skilled in the art that variations and modifications can be effected in these embodiments without departing from the spirit and scope of the invention.

We claim:

1. A method of immobilizing mixed low-level waste, which comprises:

(a) providing iron oxide powders;

(b) providing said low-level waste as a powder;

(c) forming a solution comprising orthophosphoric acid;

(d) mixing said waste powder, said iron oxide powders and said solution in mass % of waste powder:iron oxide powders:acid solution=30–60:15–10:55–30 to form a slurry;

(e) blending said slurry to form a homogeneous mixture; and (f) curing said homogeneous mixture at room temperature to form a final product.

2. The method according to claim 1, wherein said iron oxide powders comprise a mixture of iron oxide powders having ratios in mass % $FeO:Fe_2O_3:Fe_3O_4$= 25–40:40–10:35–50.

3. The method according to claim 1, wherein said iron oxide powders comprise metallurgical cinder.

4. The method according to claim 3 wherein iron oxides are added to said cinder to adjust the ratio to be $FeO:Fe_2O_3:Fe_3O_4$=25–40:40–10:35–50.

5. The method according to claim 1, wherein said iron oxide powders comprise magnetite.

6. The method according to claim 5 wherein said solution comprising orthophosphoric acid further comprises ferric oxide.

7. The method according to claim 1, wherein said low-level waste is mixed with said iron oxide powders to form a powder phase and said orthophosphoric acid solution is added to said powder phase.

8. The method according to claim 1, wherein said low-level waste is mixed with said orthophosphoric acid solution, and said iron oxide powders are then added.

9. The method according to claim 1, wherein the amount of said low-level waste in said final product is 60 mass %.

10. The method according to claim 1, wherein the amount of said low-level waste in said final product is 30–40 mass %.

11. The method according to claim 1, wherein said mass % of the acid solution in said slurry is 50 mass %.

12. The method according to claim 1, wherein said mass % of the acid solution in said slurry is 55 mass %.

13. The method according to claim 1, wherein the orthophosphoric acid content, without water, of said slurry is 25–35 mass %.

14. The method according to claim 1, wherein the concentration of said orthophosphoric acid used in step (c) is from 50–83%.

15. A method of immobilizing mixed low-level waste, which comprises:

(a) providing a mixed low-level waste powder;

(b) providing a predetermined amount of magnetite powder;

(c) forming an acid solution of orthophosphoric acid and ferric oxide;

(d) mixing said low level waste powder, said magnetite powder, and said acid solution in mass % of waste powder:magnetite powder:acid solution= 30–60:15–10:55–30 to form a slurry;

(e) blending said slurry to form a homogeneous mixture; and (f) curing said homogeneous mixture at room temperature to form a final product.

16. The method according to claim 15, wherein said acid solution is added to a powder phase of said waste powder and said magnetite powder in step (d).

17. The method according to claim 15, wherein said acid solution of orthophosphoric acid and ferric oxide is first mixed with said waste powder, and then is added to said magnetite powder in step (d).

18. The method according to claim 15, wherein the amount of said low-level waste in said slurry is 30 to 40 mass %.

19. The method according to claim 15, wherein the mass % of said acid mixture in said slurry is 50 to 55 mass %.

* * * * *